United States Patent
Chen et al.

(10) Patent No.: US 11,717,906 B1
(45) Date of Patent: Aug. 8, 2023

(54) METHOD FOR CUTTING SIDE PLATES AND END PLATES OF SCRAPPED RAILWAY BOXCAR

(71) Applicant: China Railway General Resources Technology Co., Ltd., Hefei (CN)

(72) Inventors: Baomin Chen, Hefei (CN); Mazhong Ya, Hefei (CN); Weirong Kong, Hefei (CN); Hui Liu, Hefei (CN); Liangcheng Shen, Hefei (CN); Lihua Wang, Hefei (CN); Rui Jin, Hefei (CN); Sisi Lu, Hefei (CN)

(73) Assignee: China Railway General Resources Technology Co., Ltd., Hefei (CN)

( * ) Notice: Subject to any disclaimer, the term of this patent is extended or adjusted under 35 U.S.C. 154(b) by 0 days.

(21) Appl. No.: 18/103,502

(22) Filed: Jan. 31, 2023

(30) Foreign Application Priority Data

Apr. 13, 2022 (CN) .......................... 202210388427.8

(51) Int. Cl.
*B23K 10/00* (2006.01)
(52) U.S. Cl.
CPC .................. *B23K 10/00* (2013.01)
(58) Field of Classification Search
CPC . Y10T 83/0524; Y10T 83/04; Y10T 83/0538; Y10T 83/0543; Y10T 83/0548; Y10T 83/0553; Y10T 83/0572; B23K 10/00
See application file for complete search history.

(56) References Cited

U.S. PATENT DOCUMENTS

| 2011/0316977 | A1* | 12/2011 | Pienaar | G05B 19/4068 348/46 |
| 2020/0094431 | A1* | 3/2020 | Forlong | B26D 7/1845 |
| 2020/0108460 | A1* | 4/2020 | Rozot | B23K 7/102 |

FOREIGN PATENT DOCUMENTS

| CN | 111790969 | A | 10/2020 |
| CN | 211804201 | U | 10/2020 |
| CN | 212705291 | U | 3/2021 |

* cited by examiner

*Primary Examiner* — Phong H Nguyen
(74) *Attorney, Agent, or Firm* — Bayramoglu Law Offices LLC

(57) ABSTRACT

A method for cutting side plates and end plates of a scrapped railway boxcar aims to improve low disassembling efficiency as it is difficult to disassemble the scrapped railway boxcar. The steps of cutting the side plates includes: A1: cutting a top of an upper side plate; A2: performing cutting downwards, dividing the upper side plate, and then cutting the left upper side plate; A3: cutting the right upper side plate; A4: cutting a lower side plate; A5: cutting off upper channel steel on columns; A6: cutting off lower channel steel on the columns; and A7: cutting the columns. The method avoids complicated working conditions of directly cutting angle iron, the channel steel, multilayer boards and closed regions, so that the cutting efficiency of the side plates and the end plates of the boxcars is improved. Moreover, automatic cutting can be realized according to a set cutting path.

5 Claims, 2 Drawing Sheets

METHOD FOR CUTTING SIDE PLATES AND END PLATES OF SCRAPPED RAILWAY BOXCAR

CROSS REFERENCE TO THE RELATED APPLICATIONS

This application is based upon and claims priority to Chinese Patent Application No. 202210388427.8 filed on Apr. 13, 2022, the entire contents of which are incorporated herein by reference.

TECHNICAL FIELD

The present invention belongs to the technical field of disposal of scrapped railway boxcars and particularly relates to a method for cutting side plates and end plates of a scrapped railway boxcar.

BACKGROUND

With increase by years of preservation quantity of railway freight cars in China, the quantity of scrapped freight cars is about to rise. How to dispose these scraped freight cars professionally in a large scale is a problem needed to be urgently faced. Boxcar disassembling construction of the railway scrapped freight cars is important work in disassembly and recycle of the railway scrapped boxcars. It is convenient to make full use of the scrapped freight cars by means of disassembly.

At present, the research direction about the railway boxcars mainly focuses on research of automatic devices, for example, a railway boxcar plate cutting device disclosed in a patent with public No. 2020203067080, and for another example, an automatic railway scrapped boxcar disassembling device disclosed in a patent with publication No. 202021065534X.

However, there is little research on a specific disassembling process of the scrapped boxcars. Usually, the railway scrapped boxcars are disassembled by way of artificial flame cutting, which is low in cutting efficiency and cannot disassemble the boxcars on a large scale. Path planning during cutting is dependent on personal experience of a worker. The railway scrapped boxcars complex in structure are formed by welding steel plates, angle iron, channel steel and the like. There are gaps among multilayer boards. The boxcars cannot be horizontally and vertically cut directly by means of a plasma cutting gun, so that it is difficult to disassemble the boxcars automatically.

SUMMARY

In order to solve the problem that the problem of low disassembling efficiency as it is difficult to disassemble the scrapped railway boxcar dependent on artificial experience at present, the present invention provides a method for cutting side plates and end plates of a scrapped railway boxcar, which reasonably plans the cutting path of the boxcars, thereby not only realizing thin wall cutting in the cutting process so as to greatly reduce the cutting difficulty, but also improving the boxcar disassembling efficiency and further disassembling complex section steel frames.

In order to solve the technical problems, the present invention adopts the technical solution as follows:

A method for cutting side plates and end plates of a scrapped railway boxcar includes: cutting the side plates of the boxcar first and then cutting the end plates of the boxcar, wherein the side plates comprise an upper side plate and a lower side plate, the upper side plate is provided with reinforcing channel steel, and a top of the upper side plate is provided with reinforcing angle iron; two ends of each side plate are provided with columns;

the side plates of the boxcar are cut according to the following path:

A1: cutting a center of the top of the upper side plate to form a rectangular opening, wherein through the rectangular opening, an intersection of two pieces of splayed channel steel on the upper side plate can be cut up;

A2: performing cutting downwards along a middle part of the rectangular opening till cutting up the lower end of the upper side plate, dividing the upper side plate into a left upper side plate and a right upper side plate, and then performing cutting along a side of the left upper side plate close to one column so as to cut the left upper side plate;

A3: performing cutting along a side of the right upper side plate close to the other column so as to cut the right upper side plate;

A4: performing cutting along a side of the lower side plate close to the column so as to cut off two lower side plates located below the upper side plate;

A5: cutting off upper channel steel on the column, wherein the upper channel steel is adaptive to the upper side plate in terms of height;

A6: cutting off lower channel steel on the column, wherein the lower channel steel is adaptive to the lower side plate in terms of height; and A7: cutting the column after cutting off the side plates on two sides of the column.

In a case where the upper channel steel and the lower channel steel of the column are cut, cutting is performed along an edge position of the upper channel steel and a junction of the upper channel steel and the column is prevented from being cut.

In some embodiments, the side plates of the boxcar are cut according to the following path:

B1: cutting off angle iron at an upper edge of each end plate;

B2: cutting off the channel steel arranged at an interval on the end plate; and cutting the channel steel on the end plate along a direction from top to bottom;

B3: segmenting the end plate into plates identical to the channel steel on the end plate in terms of quantity according to the quantity of the channel steel on the end plate and cutting the end plate according to a sequence from top to bottom, and then performing cutting along a side of the end plate close to the column so as to cut off the end plate; and B4: cutting off the channel steel on the column connected with the end plate.

In some embodiments, in a case where the end plate is cut according to the quantity of the plates, the end plate is cut along a horizontal direction of the end plate first, and then the end plate is cut off from the column.

In some embodiments, in a case where the channel steel on the column connected with the end plate is cut off, the column is then cut off, so that the column is separated from an underframe of the boxcar.

In some embodiments, in a case where the angle iron at the top of the end plate is cut, cutting is performed along a lower edge of the angle iron, so as to prevent the angle iron from being directly cut.

Compared with the prior art, the present invention has the following beneficial effects:

according to the method for cutting side plates and end plates of a scrapped railway boxcar provided by the present invention, the cutting path for the side plates and the end plates of the scrapped railway boxcar is designed, so that in a case where the side plates and the end plates of the scrapped railway boxcar are cut, complex conditions of directly cutting angle iron, channel steel, multilayered boards and closed regions are prevented as far as possible. By means of cutting in regions, the cutting efficiency for the side plates and the end plates of the scrapped railway boxcar is improved. Meanwhile, the method provided by the invention effectively avoids the problem that the boxcar cannot be automatically disassembled as the plasma cutting gun cannot horizontally and vertically cut the boxcar directly, so that automatic cutting by the plasma cutting gun can be realized according to the cutting path provided by the present invention, thereby laying a feasible foundation for automatic cutting of the side plates and the end plates of the boxcar. According to the cutting path provided by the present invention, a corresponding mechanical arm (moving arm) can be equipped to realize automatic cutting and disassembling by means of the plasma cutting gun.

BRIEF DESCRIPTION OF THE DRAWINGS

In FIG. 4, B1 is a cutting area in step B1 of the present invention (cutting of angle iron at a top of the end plate); B2 is a cutting area in step B2 of the present invention (cutting of angle iron on the end plate), the end plate including three pieces of channel steel cut and B2-1 (upper channel steel), B2-2 (middle channel steel) and B2-3 (lower channel steel) being cut sequentially according to a sequence from top to bottom; B3 is a cutting area in step B3 of the present invention (since there are three pieces of channel steel, the end plate is divided into three plates, and B3-1 (upper end plate), B3-2 (middle end plate) and B3-3 (lower end plate) are cut sequentially according to a sequence from top to bottom; B4 is a cutting area in step B4 of the present invention (cutting of channel steel on the column).

Figure 1:
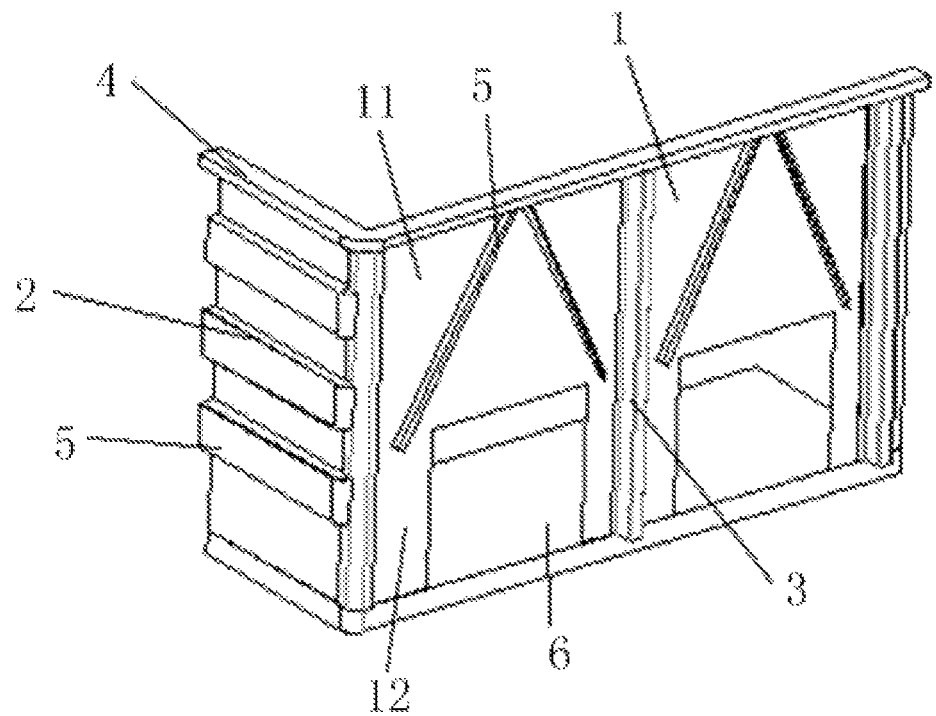
FIG. 1 is a schematic structural diagram of a railway boxcar.

Numerals in drawings: 1—side plate; 11—uppe side plate; 12—lower side plate; 2—end plate; 3—column; 4—angle iron; 5—channel steel; 6—underframe.

DETAILED DESCRIPTION OF THE EMBODIMENTS

The present invention will be further described in detail below in combination with the drawings and embodiments.

It is apparent that the described embodiments are merely a part of embodiments of the present invention and are not all the embodiments. On a basis of the embodiments in the present invention, all other embodiments obtained by those of ordinary skill in the art without making creative efforts shall fall within the scope of protection of the present invention.

In description of the present invention, it is to be noted that orientation or position relationships indicated by terms: "central", "upper", "lower", "left", "right", "vertical", "horizontal", "inner", "outer" and the like are orientation or position relationships indicated by the drawings and are only to describe the present invention and simplify the description rather than indicates or implies that the indicated device or components must have specific orientations and are configured and operated in the specific orientations; therefore, it cannot be construed as limitations to the present invention; the terms "first", "second" and "third" are merely used for a description purpose, and shall not be understood as indication or implication of relative importance; in addition, unless otherwise specified and defined, the terms "mounting", "connecting" and "connection" should be understood in a broad sense, for example, "mounting", "connecting", "connection" and "attaching" can be either fixed connection or detachable connection or integrated connection; can be mechanical connection; and can be either direction connection or indirect connection via an intermediate. Those skilled in the art can understand specific meaning of the terms in the present invention under specific circumstances.

In combination with drawings, a method for cutting side plates and end plates of a scrapped railway boxcar provided by the present invention includes: the side plates 1 of the boxcar are cut first and then the end plates 2 of the boxcar are cut, wherein the side plates 1 include an upper side plate 11 and a lower side plate 12, the upper side plate 11 is provided with reinforcing channel steel 5, and a top of the upper side plate 11 is provided with reinforcing angle iron 4; two ends of each side plate 1 are provided with columns 3. That is to say, the side plate 1 is installed between two columns 3, and the column 3 is installed on the underframe 6 of the boxcar. Since the lower portion of the side plate 1 is provided with an orifice, the upper side plate 11 in the present invention is the side plate in an area above the orifice, the lower side plate 12 therein is the side plate in an area below the orifice, and actually, the upper side plate and the lower side plate are as a whole. For the convenience of description, in the present invention, the side plate is divided into the upper side plate 11 and the lower side plate according to a top position of the orifice.

Figure 2:
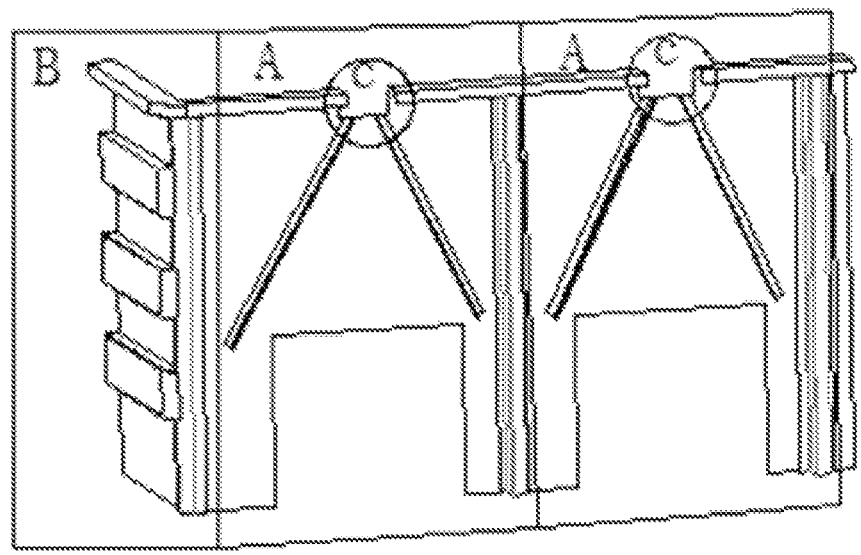
FIG. 2 is a division schematic diagram of side plates and end plats of a boxcar provided by the present invention, wherein A in FIG. 2 represents a side plate cutting area, B therein represents an end plate cutting area, and C therein represents a cutting area in step A1 of the present invention, i.e., C represents a rectangular opening cut in step A1 of the present invention.
Figure 3:
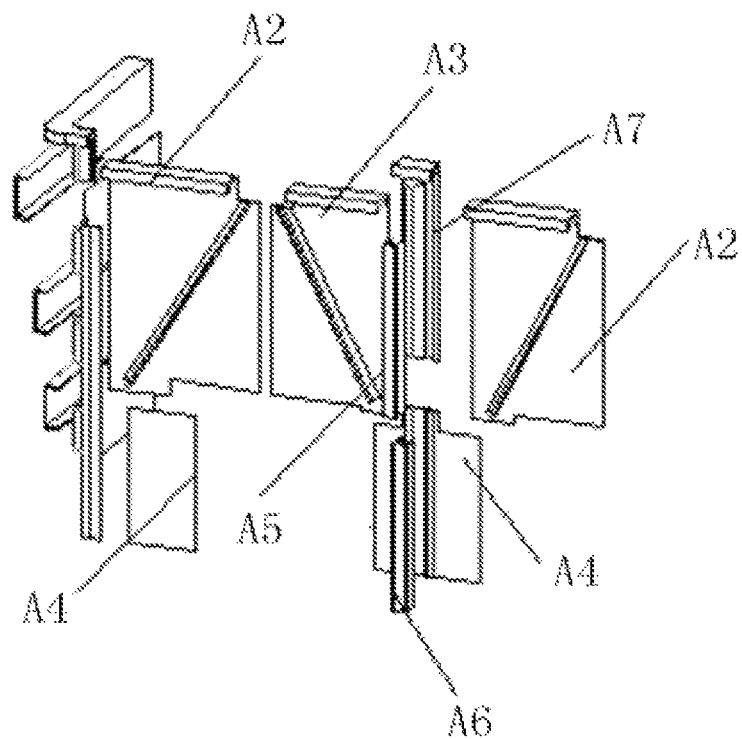
FIG. 3 is an exploded view during cutting of side plates of the present invention, wherein in FIG. 3, A2 is a cutting area in step A2 of the present invention (cutting of a left upper side plate); A3 is a cutting area in step A3 of the present invention (cutting of a right upper side plate); A4 is a cutting area in step A4 of the present invention (cutting of a lower side plate); A5 is a cutting area in step A5 of the present invention (cutting of upper channel steel on a column); A6 is a cutting area in step A5 of the present invention (cutting of lower channel steel on the column); A7 is a cutting area in step A7 of the present invention (cutting of the column).

The side plates 1 of the boxcar are cut according to the following path:

A1: a center of the top of the upper side plate 11 is cut to form a rectangular opening (C in FIG. 2), wherein through the rectangular opening, an intersection of two pieces of splayed channel steel 5 on the upper side plate 11 can be cut up; in the step A1, when the rectangular opening is formed, since the intersection is a connection of the angle iron, the channel steel and the steel plate, a manual cutting mode is preferred. Of course, in the step A1, the rectangular opening can also be cut by using other cutting devices.

A2: cutting is performed downwards along a middle part of the rectangular opening till the lower end of the upper side plate 11 is cut up, the upper side plate 11 is divided into a left upper side plate and a right upper side plate, and then cutting is performed along a side of the left upper side plate close to one column 3 (the column is shared by the side plate and the end plate) so as to cut the left upper side plate, wherein the middle of the rectangular opening is located between two pieces of channel steel, that is to say, cutting is performed downwards along a symmetric line of the two pieces of channel steel to divide the upper side plate into the left upper side plate and the right upper side plate.

A3: cutting is performed along a side of the right upper side plate close to the other column 3 so as to cut the right upper side plate;

In a specific implementation process of step A2 and step A3, in a case where the left upper side plate and the right upper side plate are cut, first cutting is performed along the middle of the two pieces of splayed channel steel 5 on the side plate first, then second cutting (the second cutting segments the side plate into the upper side plate 11 and the lower side plate 12) is performed along the orifice of the side plate 1, and finally, the left upper side plate and the column 3 are cut to cut off the left upper side plate, and the right side plate and the column 3 are cut to cut off the right upper side plate.

A4: cutting is performed along a side of the lower side plate 12 close to the column 3 so as to cut off two lower side plates 12 located below the upper side plate 11;

A5: upper channel steel on the column 3 is cut off, wherein the upper channel steel is adaptive to the upper side plate 11 in terms of height;

A6: lower channel steel on the column 3 is cut off, wherein the lower channel steel is adaptive to the lower side plate 12 in terms of height; and A7: the column 3 is cut after the side plates on two sides of the column 3 are cut off, so as to separate the column 3 from the underframe 6 of the boxcar. Since the side surface of the freight car is provided with a plurality of columns, the side plates are installed between adjacent columns, after all the side plates are cut off, the columns 3 are then finally cut.

In some embodiments, in a case where the upper channel steel and the lower channel steel of the column are cut, cutting is performed along an edge position of the upper channel steel and a junction of the upper channel steel and the column is prevented from being cut.

Figure 4:
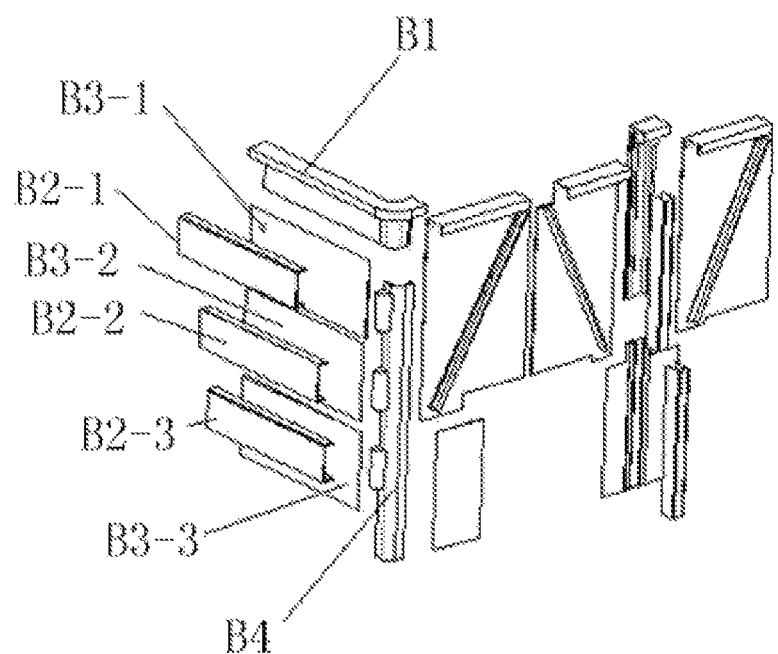
FIG. 4 is an exploded view during cutting of end plates of the present invention.

In some embodiments, the end plates 2 of the boxcar are cut according to the following path:

B1: angle iron 4 at an upper edge of each end plate 2 is cut off;

B2: the channel steel 5 arranged at an interval on the end plate 2 is cut off, and the channel steel 5 on the end plate 2 is cut along a direction from top to bottom, i.e., the channel steel on the upper portion of the end plate is cut first, the channel steel in the middle of the end plate is then cut, and finally, the channel steel on the lower portion of the end plate is cut. In combination with FIG. 4, the end plate 2 is provided with three pieces of channel steel 5, which are successively the upper channel steel, the middle channel steel and the lower channel steel according to heights of installation positions;

B3: the end plate 2 is segmented into plates identical to the channel steel on the end plate 2 in terms of quantity according to the quantity of the channel steel 5 on the end plate 2 and the end plate is cut according to a sequence from top to bottom, and then cutting is performed along a side of the end plate close to the column so as to cut off the end plate. For example, in a case where the end plate is provided with three pieces of channel steel, the end plate is divided into three plates from top to bottom and is successively cut according to a sequence from top to bottom. In combination with FIG. 4, the end plate 2 is provided with three pieces of channel steel 5, which is successively the upper channel steel, the middle channel steel and the lower channel steel according to heights of the installation positions. Therefore, the end plate 2 is divided into the upper end plate, the middle end plate and the lower end plate according to a sequence from top to bottom.

B4: the channel steel 5 on the column connected with the end plate 2 is cut off, wherein the end plate 2 and the side plate 1 share the same column 3.

In some embodiments, in a case where the end plate 2 is cut according to the quantity of the plates, the end plate 2 is cut along a horizontal direction of the end plate first, and then the end plate is cut off from the column.

In some embodiments, in a case where the channel steel 5 on the column 3 connected with the end plate 2 is cut off, the column 3 is then cut off, so that the column 3 is separated from an underframe 6 of the boxcar. Since a corner of the end plate 2 and the side plate 1 shares the same column, in a case where the column 3 is cut, it is needed to cut off the side plate and the end plate on two sides of the column 3 and then to cut the column.

In some embodiments, in a case where the angle iron 4 at the top of the end plate 2 is cut, cutting is performed along a lower edge of the angle iron 4, so as to prevent the angle iron from being directly cut.

According to the method for cutting side plates and end plates of a scrapped railway boxcar provided by the present invention, the cutting path for the side plates and the end plates of the scrapped railway boxcar is designed, so that in a case where the side plates and the end plates of the scrapped railway boxcar are cut, complex conditions of directly cutting angle iron, channel steel, multilayered boards and closed regions are prevented as far as possible. By means of cutting in regions, the cutting efficiency for the side plates and the end plates of the scrapped railway boxcar is improved. Meanwhile, the method provided by the invention effectively avoids the problem that the boxcar cannot be automatically disassembled as the plasma cutting gun cannot horizontally and vertically cut the boxcar directly, so that automatic cutting by the plasma cutting gun can be realized according to the cutting path provided by the present invention, thereby laying a feasible foundation for automatic cutting of the side plates and the end plates of the boxcar. According to the cutting path provided by the present invention, a corresponding mechanical arm (moving arm) can be equipped to realize automatic cutting and disassembling by means of the plasma cutting gun.

The invention claimed is:

1. A method for cutting side plates and end plates of a scrapped railway boxcar, comprising: cutting the side plates of the scrapped railway boxcar first and then cutting the end plates of the scrapped railway boxcar, wherein the side plates comprise an upper side plate and a lower side plate, the upper side plate is provided with a reinforcing channel steel, and a top of the upper side plate is provided with a reinforcing angle iron; two ends of each of the side plates are provided with columns;

the side plates of the scrapped railway boxcar are cut according to the following path:
A1: cutting a center of the top of the upper side plate to form a rectangular opening, wherein through the rectangular opening, an intersection of two pieces of splayed channel steel on the upper side plate is configured to be cut up;
A2: performing cutting downwards along a middle part of the rectangular opening till cutting up a lower end of the upper side plate, dividing the upper side plate into a left upper side plate and a right upper side plate, and then performing cutting along a side of the left upper side plate close to one column so as to cut the left upper side plate;

A3: performing cutting along a side of the right upper side plate close to the other column so as to cut the right upper side plate;

A4: performing cutting along a side of the lower side plate close to the column so as to cut off two lower side plates located below the upper side plate;

A5: cutting off an upper channel steel on the column, wherein the upper channel steel is adaptive to the upper side plate in terms of a height;

A6: cutting off a lower channel steel on the column, wherein the lower channel steel is adaptive to the lower side plate in terms of the height and wherein cutting is performed along an edge position of the upper channel steel when the upper channel steel and the lower channel steel of the column are cut, and a junction of the upper channel steel and the column is prevented from being cut; and A7: cutting the column after cutting off the side plates on two sides of the column;

the end plates of the scrapped railway boxcar are cut according to the following path:

B1: cutting off an angle iron at an upper edge of each of the end plates;

B2: cutting off a channel steel arranged at an interval on the each of the end plates, and cutting the channel steel on the each of the end plates along a direction from a top to a bottom;

B3: segmenting the each of the end plates into plates identical to the channel steel on the each of the end plates in terms of a quantity according to the quantity of the channel steel on the each of the end plates and cutting the each of the end plates according to a sequence from the top to the bottom, and then performing cutting along a side of the each of the end plates close to the column so as to cut off the each of the end plates; and B4: cutting off the channel steel on the column connected with the each of the end plates.

2. The method for cutting the side plates and the end plates of the scrapped railway boxcar according to claim 1, wherein when the each of the end plates is cut according to the quantity of the plates, the each of the end plates is cut along a horizontal direction of the each of the end plates first, and then the each of the end plates is cut off from the column.

3. The method for cutting the side plates and the end plates of the scrapped railway boxcar according to claim 2, wherein when the channel steel on the column connected with the each of the end plates is cut off, the column is then cut off, so the column is separated from an underframe of the scrapped railway boxcar.

4. The method for cutting the side plates and the end plates of the scrapped railway boxcar according to claim 1, wherein when the channel steel on the column connected with the each of the end plates is cut off, the column is then cut off, so the column is separated from an underframe of the scrapped railway boxcar.

5. The method for cutting the side plates and the end plates of the scrapped railway boxcar according to claim 1, wherein when an angle iron at a top of the each of the end plates is cut, cutting is performed along a lower edge of the angle iron so as to prevent the angle iron from being directly cut.

* * * * *